July 7, 1959 M. J. RELIS ET AL 2,894,248

BORDER FOLLOWER SYSTEM

Filed May 6, 1957 5 Sheets-Sheet 1

INVENTORS.
MATTHEW J. RELIS
WILLIAM YUNI
BY Eli Weiss
ATTORNEY

INVENTORS.
MATTHEW J. RELIS
WILLIAM YUNI
BY Eli Weiss
ATTORNEY

BORDER FOLLOWER SYSTEM

Filed May 6, 1957 5 Sheets-Sheet 3

INVENTORS.
MATTHEW J. RELIS
WILLIAM YUNI
BY Eli Weiss
ATTORNEY

INVENTORS.
MATTHEW J. RELIS
WILLIAM YUNI
BY Eli Weiss
ATTORNEY

INVENTORS.
MATTHEW J. RELIS
WILLIAM YUNI
BY Eli Weiss
ATTORNEY

United States Patent Office
2,894,248
Patented July 7, 1959

2,894,248

BORDER FOLLOWER SYSTEM

Matthew J. Relis, Bayside, and William Yuni, East Meadow, N.Y., assignors to Burroughs Corporation, Detroit, Mich., a corporation of Michigan Application May 6, 1957, Serial No. 657,124
16 Claims. (Cl. 340—149)

This invention relates in general to the sensing of a portion of a document and more particularly to a device that locates on a sheet of paper a particular area positioned relative to a reference zone.

In the identification of printed characters in which successive portions of each printed character are scanned by a photoelectric cell that generates a two valued voltage output signal to represent the sensing of the black and white areas of the character scanned, it is imperative that only the desirable information is sensed. The premature or retarded sensing of the printed characters will result in the sensing of both desirable and undesirable information to cause erroneous identifications.

Premature or retarded sensing of characters by character recognition systems which detect the dimensions of the character or the thickness of the printed parts of the character will also result in the sensing of both desirable and undesirable information to produce spurious identification.

In the identification of a plurality of printed symbols where the contents of a complete page or a serial number of a particular item must be identified; the scan period of each cycle must commence immediately before, and terminate immediately after the occurrence of the predetermined area that is to be scanned. The premature or retarding sensing of the printed character will result in the sensing of additional undesirable information to generate spurious results.

In actual practice, however, the documents that are utilized vary in thickness and composition and, in many instances the characters that are to be identified are not positioned accurately relative to an edge of the document. In most instances, the printed characters that are to be identified will be on paper that has been utilized in ordinary business procedure which results in documents that are marred, deformed and/or creased. Thus, it becomes extremely difficult to align accurately the scanning device with the desired area of a document which contains the characters that are to be identified.

Thus, it readily becomes apparent that to insure reliable character identification the particular area of the document which contains the desired information must be positioned accurately relative to the scanning device by utilizing a reference area other than an edge of the document.

It is a primary object of this invention to provide a device that locates accurately a particular area of a document.

It is another object of this invention to provide a device that locates accurately a particular area on a document that has marred or deformed edges.

It is another object of this invention to provide a device that locates accurately a particular area on a document independently of the thickness or composition of the document utilized.

It is still another object of this invention to provide a device that is economical to produce and reliable in operation.

It is an additional object of this invention to provide a device that can locate and scan a particular area containing printed characters on old or new documents.

Other objects and many of the attendant advantages of this invention will be readily appreciated as the apparatus becomes better understood by reference to the following detailed description when considered in connection with the accompanying drawings wherein.

Briefly, a document is prepared to exhibit a contrasting zone positioned adjacent to an area allotted to the display of contrasting symbols. A scanning means that generates signals representative of the information sensed is positioned to detect a portion of the contrasting symbols and contrasting zone during a portion of each scan cycle. The signal that represents the sensing of the contrasting zone is utilized to allow only those signals that represent the sensing of the contrasting symbol to appear on an output terminal; all other sensed information is inhibited.

The contrasting zone or border as it shall hereinafter be referred to can be introduced to act as a guide for the sensing of a particular area, or as a separator to isolate an area that contains desirable information from an area that contains undesirable information. The border can exist on the document within the field being scanned as a line or an edge. However, the magnitude of the signals that represent the sensing of the symbol must be substantially equal to the magnitude of the signal that represents the border. The symbols on the document that are to be identified may appear in their standard form of a black configuration on a white background. As each symbol is scanned, the scanning device converts the sensed information into a pattern of pulse signals. Each particular symbol generates a discrete pattern of signals. The scanning device disclosed in the copending application entitled: Character Recognition Device by Matthew J. Relis, Serial No. 396,280, filed December 4, 1953, can be utilized to scan the face of a document. For purposes of illustration and to facilitate the explanation of the operation of this invention, the scanning device mentioned above shall be utilized, it being understood, however, that this invention is not restricted to this particular scanning device. The scanner chosen for purposes of illustration generates two separate but related signals. The first or video signal generated appears each time that a relatively dark area of the document such as a portion of the border or the symbol which is scanned is sensed by the scanning device. The other, or scan signal generated is a saw-tooth wave which exhibits a minimum potential at the start of each scan cycle, and a maximum potential at the end of each scan cycle.

Figure 1:
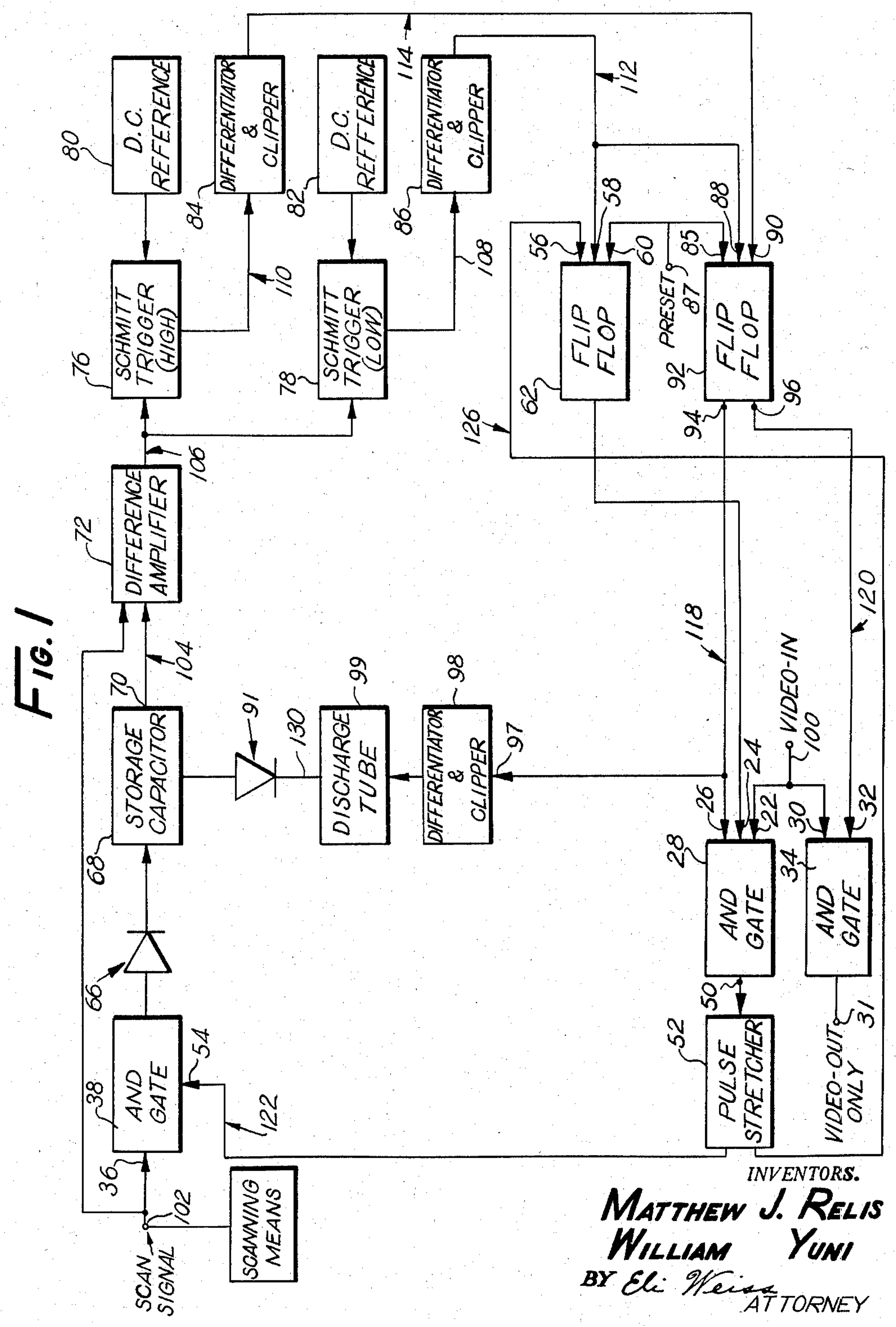
Fig. 1 is a block diagram of this invention.
Figure 2:
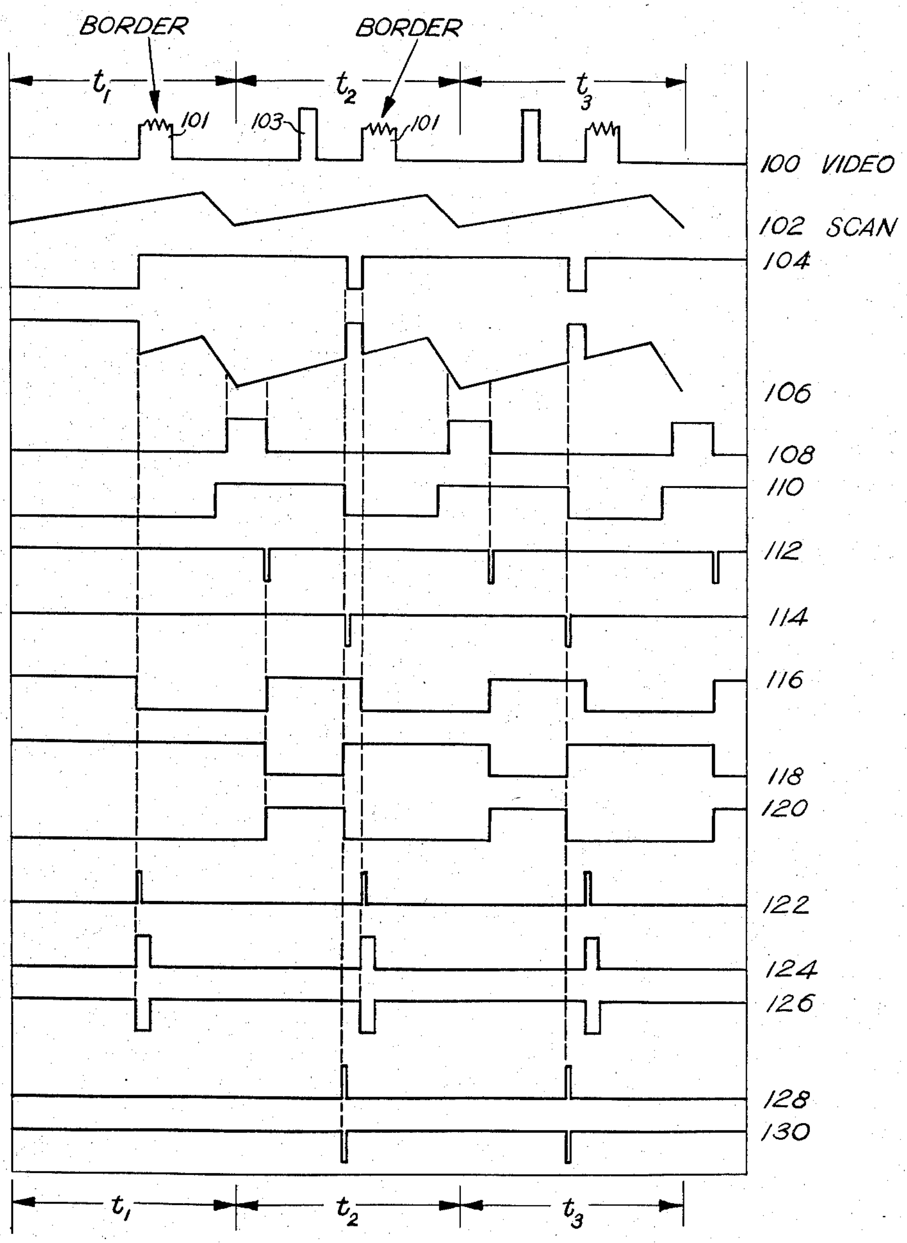
Fig. 2 is a timing diagram of signals present at various indicated positions in the block diagram of Fig. 1.

Referring to Figs. 1 and 2, therein is disclosed a block diagram of this invention and the wave forms of the signals as they appear at the various indicated positions within the device. The video signals generated by the scanning means are fed to input terminals 22 and 30 of And gates 28 and 34, respectively. The video signals that exhibit a more positive potential represent the sensing of a black area and, therefore, a portion of a symbol. The positive-going video signals generated by the scanning device will hereinafter be referred to as the black video signals. The saw-tooth wave scan signal generated by the scanning device is fed into an input terminal 36 of an And gate 38.

Referring to Fig. 2, the saw-tooth wave or scan cycle is represented by the wave 102, and the video signal is represented by the wave 100. The first appearing pulse 101 of the video signal 100 represents the sensing of a border, and the next appearing pulse 103 represents the sensing of a portion of a printed character positioned in the desired area scanned.

In its initial state, And gate 28 is opened or conditioned to pass all video signals that are fed to the input terminal 22; and the And gate 34 is closed or conditioned to inhibit the passage of all video input signals that are fed to the input terminal 30.

Figures 3, 4:
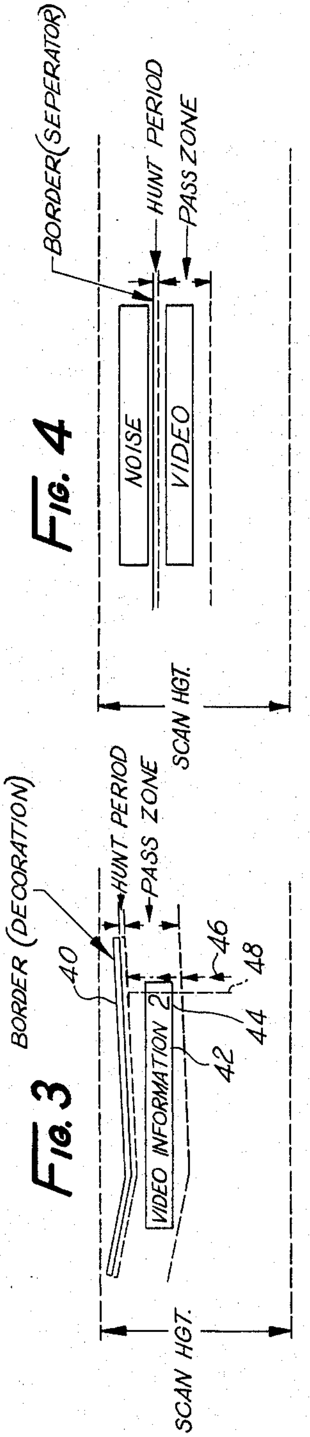
Fig. 3 illustrates the face of a document that contains a decorative border which is utilized to locate a particular area.
Figs. 4 and 5 illustrate documents that contain decorative borders that are utilized to locate a desirable area, and discriminate against an area that contains undesirable noise and is located within close proximity to the desirable area.

Fig. 3 illustrates the face of a document that contains a contrasting decorative border 40 positioned in close proximity to an area 42 which displays the printed characters 44. For purposes of explanation it shall be assumed that the only information that it is desired to identify is that information that is contained within the area 42.

The first scan of each series of scans is utilized to determine the position of the border and, therefore, occurs prior to the occurrence of the video signal that represents the first printed character. The trace 46 indicates the area scanned during the first scan cycle. This scan is utilized to locate the border for utilization as a reference in determining the position of the printed symbols. After the position of the border is established by the first trace, the device is in condition to sense and identify the printed characters. The trace 48 of the next appearing scan senses first the printed character and then a portion of the border to generate information that is representative of the portion of the character sensed and the position of the border. The border signal generated during the first scan cycle allows only the desirable video signals that are generated during a portion of the second scan cycle to pass. The undesirable video signals, or those signals generated by the sensing of information that appears outside the area 42 are inhibited. The location of the area 42, and therefore the passing zone of information sensed during the scan cycle is determined automatically by the location of the border. If the location of the border within the scan does not vary appreciably from scan to scan, then the position of the border can be accurately anticipated for the next scan cycle. In addition, by knowing the boundaries of the area 42 relative to the border 40, and the anticipated position of the border during the next scan cycle, then all signals that represent scanned information from the area 42 will be passed and all other video information will be inhibited.

Referring again to the Figs. 1 and 2, the first pulse 101 of the signal 100 transmitted to the And gate 28 represents the sensing of the border. This pulse signal is passed through And gate 28 to appear at output terminal 50 and is illustrated by graph 122 of Fig. 2. The output signals from the And gate 28 are fed through a pulse stretcher 52 and then to an input terminal 54 of the And gate 38 and to an input terminal 56 of a flip-flop 62. This signal changes the conductive state of the flip-flop 62 which opens the And gate 28 to inhibit the flow of signals through And gate 28. The wave shape of the output signal of the pulse stretcher 52 fed to the And gate 38 is illustrated by curve 124. This signal conditions the And gate 38 to pass signals. The scan signals illustrated by curve 102 are directly proportional to the position of the scanning spot. This invention, however, does not require a linear scan signal to operate in a satisfactory manner. However it does require a scan signal that exhibits a repetitive wave form. Thus, the magnitude of the signal that appears at the output terminal of the And gate 38 is directly proportional to the position of the border on the document. The signal that appears on the output terminal of the And gate 38 is fed through a crystal diode 66 to a storage capacitor 68. The crystal diode 66 prevents the capacitor from discharging by isolating it from the gate 38. The magnitude of the charge on the storage capacitor 68 corresponds to the position of the border. This charge remains on the condenser for a period that is slightly less than a complete scan cycle, and is removed just prior to the expected occurrence of the border during the next scan.

Thus, during each scan cycle the storage capacitor is discharged just prior to the sensing of the border, and is recharged when the scanning spot senses the border. The charge on the storage condenser 68, and therefore the signal that is present at the output terminal 70 of the storage capacitor is illustrated by curve 104.

A difference amplifier 72 which generates an output signal proportional to the differential of two input signals is connected to receive the scan signal 102 and the output signal 104 of the storage capacitor 68. The signal that appears at the output terminal of the difference amplifier 72 is proportional to the differential of the two input signals, and is illustrated by curve 106. The output signal of the amplifier 72 is fed simultaneously to the input terminals of a first Schmitt trigger 76 and a second Schmitt trigger 78.

The two Schmitt triggers 76 and 78 are voltage sensitive means which establish the passing zone for the video signals. The two trigger circuits 76 and 78 are designated as the high and low triggers respectively. The high Schmitt trigger is preset to fire at the high end of the scan or just prior to the occurrence of the signal that represents the border by a reference source of direct current 80. The low Schmitt trigger is preset to fire at the low end of the scan or at the furthest point from the border that video information will be encountered by a reference source of direct current 82. The cut off limits of the passing zone are established by comparing the instantaneous magnitude of the scan signal curve 102 with the corresponding stored level curve 104 which represents the anticipated border location. A new signal which represents the position of the border is stored every scan. In this manner a variation in time of occurrence, or position of the border will cause a variation in the magnitude of the stored signal and a corresponding change in the curve 106 to cause the high and low Schmitt triggers to fire earlier or later in the scan cycle depending upon whether the border appears sooner or later.

The maximum border change per scan or border slope that can be followed accurately is dependent upon the following:

(1) The vertical scan rate with respect to the horizontal feed rate of the document; and (2) The distance between the border and the point closest to the border that may contain desirable information.

Thus, the ability of this device to anticipate and detect the occurrence of the next appearing portion of the border is largely dependent upon the scanning system and the field being scanned.

The wave shapes of the output signals from the high and low Schmitt triggers is represented by curves 110 and 118 respectively. The output signals of the high Schmitt trigger 76 are differentiated and clipped in the network 84 to produce negative going trigger pulses; and the output signals of the low Schmitt trigger 78 are differentiated and clipped in the network 86 to produce negative going trigger pulses. The wave forms of the signals that appear at the output terminals of the networks 84 and 86 are illustrated respectively by the curves 114 and 112.

The differentiated and clipped output signals from the networks 84 and 86 are fed sequentially to the flip-flop 92 through the input terminals 88 and 90 to first set and then reset the flip-flop. The complementary signals generated and that appear on the output terminals 94 and 96 of the flip-flop 92 are illustrated respectively by the curves 118 and 120. The output terminal 96 is coupled to feed a signal to the input terminal 32 of the And gate 34; and the output terminal 94 is coupled to feed a signal to the input terminals 26 and 97 of the And gate 28 and differentiator and clipper network 98 respectively. The more positive signals from the output terminal 96 set the And gate 34 to allow the desirable video signals to pass through the gate to appear at the output terminal 31. Thus, only a particular portion of the video input signals fed to the input terminal of the And gate 34 appear at the output terminal 31. Since the signals that appear on the two output terminals of the flip-flop 92 are complementary to each other, and since the output signals from the flip-flop 92 determines the conditions of the gates, then the And gates 28 and 34 will never conduct simultaneously and the video signal will be gated through either one or the other of the And gates 28 and 34 at any particular instant.

The flip-flop 62 is activated by negative pulse signals from the differentiator and clipper network 86 and from the pulse stretcher 52; and the flip-flop 92 is activated by negative pulse signals from the differentiator and clipper networks 84, and 86. Referring to curves 112, 126, and 116, the negative output signal from the differentiator and clipper network 86 drives the flip-flop 92 to a set state, and the negative output signal from the pulse stretcher 52 drives the flip-flop 62 to a reset state.

Immediately after the border is sensed the low Schmitt trigger 78 generates a pulse signal which is fed through the differentiator and clipper network 86 to drive the flip-flop 62 to the set state. Thus, a positive potential pulse signal appears at the output terminal of the flip-flop 62 immediately after the border is sensed. This positive output signal is fed to and attempts to open the And gate 28 from the start of the passing zone to immediately after the sensing of the border signal. The combination of signals fed to the input terminals 24 and 26 of the And gate 28 cooperate to open the gate 28 for the brief period from the end of the passing zone to the start of the border. It is only during this brief period designated as the hunt period (Fig. 3) that the And gate 28 can pass video information. It is during this period that a search is made for the border by conditioning the And gate 28 with the output signals from the flip-flops 62 and 92 to pass all video signals generated during the hunt period. The only video signal that can occur during the hunt period represents the sensing of the border.

The output signal from the And gate 28 is first stretched in a pulse stretcher 52 and then fed to the And gate 38 to keep that gate open for a time duration which is sufficient to allow the storage capacitor 68 to charge up to the true value of the scan signal. This time duration is necessary as a slight time delay occurs when the capacitor is charged.

At the start of the hunt period, or at the beginning of the search for the border, the high Schmitt trigger 76 activates the flip-flop 92 and a positive pulse signal is fed to the input terminal 97 of a differentiator and clipper network 98. The output signal of the network 98 is illustrated by curve 128. This signal is fed to a discharge tube 99 which discharges the storage capacitor 68 rapidly through a crystal diode 91.

Thus, in the operation of this invention, the flip-flops 62 and 92 initially condition the And gate 28 to pass sensed video signals and the And gate 34 to inhibit sensed video signals. The first video signal generated represents the sensing of the border. This signal is passed through And gate 28 and pulse stretcher 52 to open And gate 38 to allow storage capacitor 68 to be charged to a specific value. The output signal of the pulse stretcher 52 is also fed to an input terminal of the flip-flop 62 to generate a signal which closes the And gate 28. At this instant the gates 28 and 34 are in the closed condition and, as such, all input video signals are inhibited. The difference amplifier 72 compares the signal on the storage capacitor 68 with the scan signal, and its output signal is fed, simultaneously, to the high and low Schmitt triggers. Since the output signals of the Schmitt triggers are differentiated and then clipped, then, in effect it is the fall portion of the positive pulse output signals of the triggers that are of interest. The low Schmitt trigger generates a negative pulse signal which is fed to the network 86 to change the conductive states of the flip-flops 62 and 92. At this instant the flip-flop 92 feeds a positive potential signal to And gate 34 and a negative potential signal to And gate 28. Thus, gate 34 is conditioned to pass video signals, and gate 28 is conditioned to inhibit video signals.

At some instant prior to the sensing of the border, the high Schmitt trigger, acting through the differentiator and clipper network 84, generates a negative pulse signal which is fed to and changes the conductive state of the flip-flop 92 to close And gate 34 and open And gate 28. The positive potential pulse from the output terminal 94 of the flip-flop 92 is fed to and sets And gate 28. This signal is also fed to the differentiator and clipper network 98. The output signal of the network 98 is fed to the discharge tube 99 to initiate the discharge of the storage capacitor 68. Thus, the And gate 28 is open and the storage capacitor is in condition to be recharged to a potential determined by the time occurrence of the signal representative of the border relative to the scan signal. The wave forms of the output signals of the network 98 and discharge tube 99 are illustrated by the curves 128 and 130 respectively.

The video signals passed through the And gate 34 are determined by the occurrence of positive pulses from the output terminal 96 of the flip-flop 92 as indicated by the curve 120. The time of occurrence of the positive pulse signals are determined by the position of the signal which represents the border.

If the system is to operate on a number of fields consecutively, a preset pulse generated after each field is scanned is fed to a preset input terminal 87 to ready the system for the next appearing field. The preset input terminal 87 is coupled to input terminals 60 and 85 of the flip flops 62 and 92 respectively.

A start or stop action pulse can be introduced into this invention at any one of several positions.

Figures 5, 6:
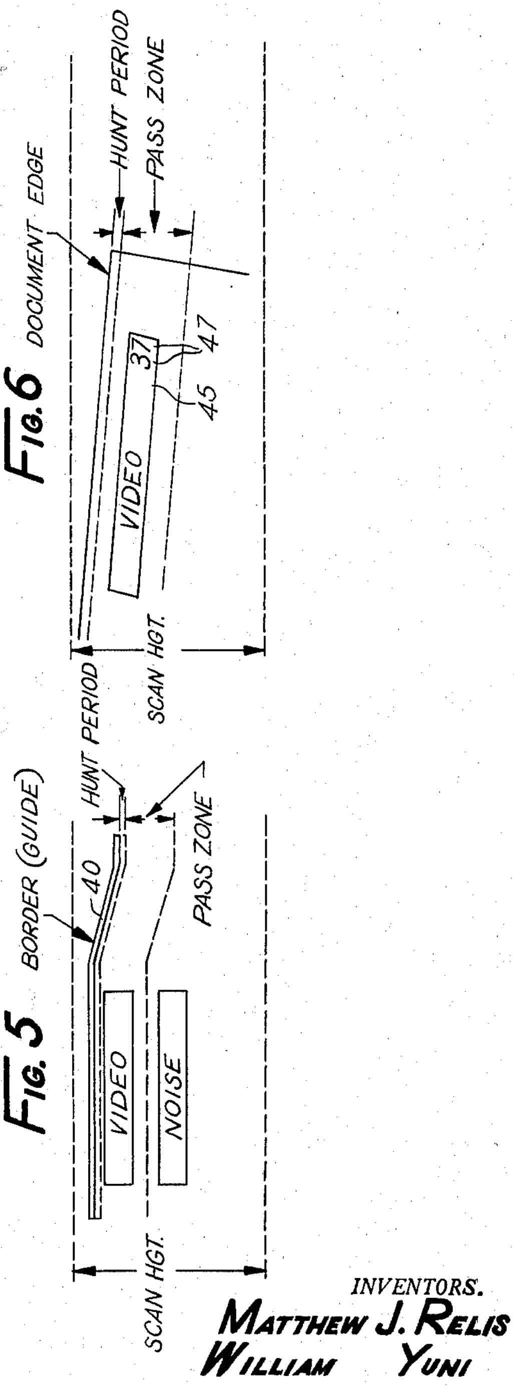
Fig. 6 illustrates the utilization of a document edge to locate a particular desirable area on a document.

Referring to Fig. 3, the border 40 illustrated was originally present on a document for decorative purposes, however, it was utilized by this invention to more accurately locate the area 42 that displayed the printed characters. Figs. 4 and 5 illustrate how the border can be utilized not only to locate the area which displays the printed characters but also indicates how the border can function as a separator or filter to isolate an area that contains noise from the area that contains the desired printed characters which are to be identified. In Fig. 6 the edge of a document is utilized as a border to determine the position of a particular area 45 which displays printed characters 47, however, the edge of the document must present a contrasting surface relative to the background area. The border line between the contrasting surfaces, or the edge of the document functions in the same manner as the drawn contrasting border to locate a particular area.

The system described above is based on scan spot vertical position information; however, this invention can operate in a satisfactory manner when based on scan timing information. The systems are based on the same logic, however, the first system does not impose any stringent amplitude and frequency requirements on the scanning generator as is required by the system based on scan timing information. Thus, in the second system, as in the previously described system, if the location of a border on a document is determined each scan and does not vary appreciably from scan to scan, then its position can be accurately anticipated for each succeeding scan. If, in addition, the limits of the area that displays the printed characters are known, then having been given the expected location of the border for the coming scan cycle, the occurrence of video information outside of these limits is inhibited and the occurrence of video information within the limits is passed.

The following system operates on a timing basis, therefore, a varying linear scan signal of known frequency and amplitude is required. Each scan can be divided into two portions one of which is the passing zone or read interval. Since the location of the passing zone with respect to the border is known, the border can be used as a reference in establishing the above intervals. As in the previously described system, however, the border must be detected before the desired printed characters are detected to enable the item detected to be identified.

Figure 7:
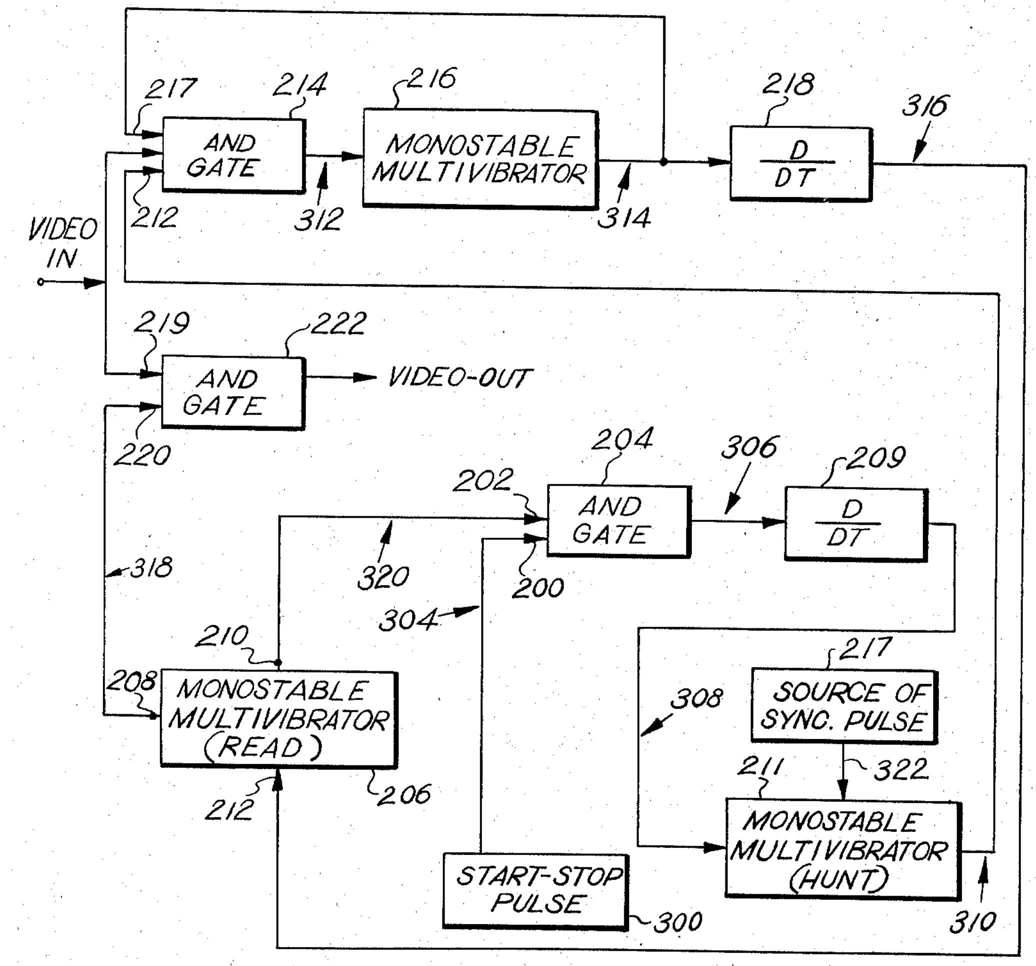
Fig. 7 illustrates a block diagram of a modified form of this invention.
Figure 8:
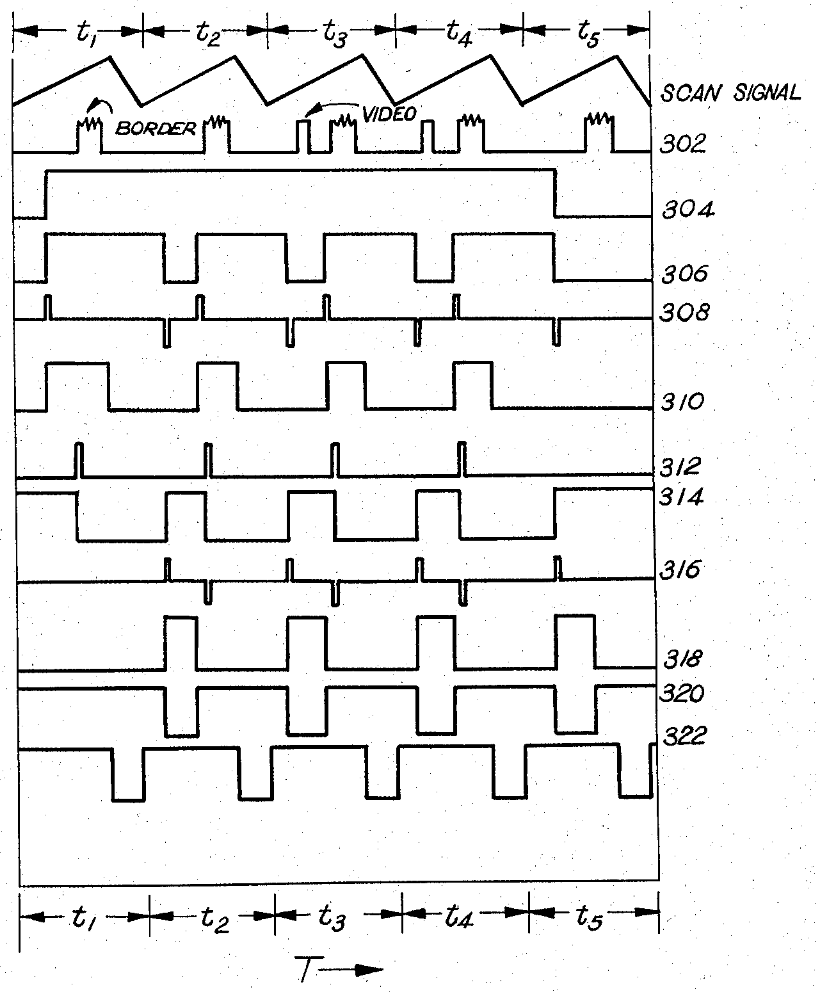
Fig. 8 is a timing diagram of signals present at the various indicated positions in the block diagram of Fig. 7.

Referring to Figs. 7 and 8, a mono-stable multivibrator 206 contains an input terminal 212 and two output terminals 208 and 210. The output terminal 210 is normally positive and is coupled to an input terminal 202 of an And gate 204. A source of start-stop pulse signals 300 is coupled to feed the generated signal 304 to a second input terminal 200 of the And gate 204. The application of the start-stop pulse signal opens gate 204 to pass positive pulse signals 320 present at the output terminal 210 of the multivibrator 212. The output signals 306 of And gate 204 are fed through a differentiator 209 appear as signal 308, the positive pulses of which trigger to a mono-stable multivibrator 211. The positive pulse of the output signal 310 of the multivibrator 211 is fed to an input terminal 212 of an And gate 214 to function as an enabling pulse to allow video information to pass through the And gate 214.

After a specific interval of time a synchronizing pulse signal 322 from a source of synchronizing pulses 217 is fed into the mono-stable multivibrator 211 to indicate the end of the scan by changing the potential of the signal that appears on the output terminal of the multivibrator 211.

In this manner the hunt period is terminated by the occurrence of the border signal since the border signal always precedes the synchronizing pulse signal in each scan. Signals that represent the sensing of the border are passed through And gate 214 to trigger the mono-stable multivibrator 216 to generate a more negative signal. The output signal 314 of the multivibrator 216 is fed back to an input terminal 217 of the gate 214. This more negative signal closes the gate 214 immediately subsequent to the sensing of the border to produce a single short positive pulse signal 312 at the output terminal of the And gate 214. The output signal 314 of the multivibrator 216 is fed through to a differentiator network 218 which produces a positive pulse trigger signal 316 which is synchronized with the leading edge of the positive pulse signal 314. The positive pulse signal from the differentiator network 218 is fed to the mono-stable multivibrator 206 to produce a more positive potential signal on the output terminal 208 (curve 318 of the timing diagram) and a less positive potential signal on the output terminal 210 (curve 320 of the timing diagram). The more positive potential pulse signal from the output terminal 208 of the multivibrator 206 is fed to an input terminal 220 to enable And gate 222 to pass desired video signals that appear at the input terminal 219 of And gate 222. The passed video signals represent the printed characters that are to be identified.

At the end of the read interval, the signal that appears on the output terminal 210 of the multivibrator 206 becomes more positive and the signal that appears on the output terminal 208 becomes more negative. The And gate 222 is closed to inhibit the passage of video information and the And gate 204 is opened to pass a pulse signal which opens And gate 214. At the end of the scan, the multivibrator 211 is turned off by a pulse signal from the source of synch pulses 217. In this manner the termination of the hunt period is insured by the occurrence of a border signal which always precedes a synchronizing pulse in the scan cycle.

Border signals which occur prior to the generation of desirable video signals are passed through the gate 214 to trigger mono-stable multivibrator 216. The output signal 314 of the multivibrator 216 is fed back to the gate 214 to close the gate immediately after the scanning spot detects the border. This feed back channel results in the generation of a single, short positive pulse signal 312 at the output terminal of And gate 214. The differentiating network 218 operates on the output signal 314 from the multivibrator 216 to form positive trigger signals 316 synchronized with the trailing edge of the output signal 314 from the multivibrator 216. Mono-stable multivibrator 206 is activated by the positive pulse signals 316 to start the read interval by opening the gate 222 to allow desired video signals to pass through. The more negative output signal of the multivibrator 206 appears at the output terminal 210.

At the end of the read interval, a more positive signal appears at the output terminal 210, of multivibrator 206 to again initiate the hunt period after the termination of the read interval. The presence of the start pulse signal allows the leading edge of the positive portion of signal 320 to pass through gate 204 to trigger the multivibrator 211. The output signal from the multivibrator opens the gate 214 to allow border signals to pass through, and the system operates as a border follower as long as the start-stop signal 304 is present.

To stop the operation of the device, the gate 204 is closed by interrupting the start-stop signal. The multivibrator 211 is prevented from firing and the gate 214 remains closed. By virtue of the circuit design, the multivibrator 216 cannot be fired when the gate 214 is closed, thus multivibrator 206 is not triggered, And gate 222 remains closed, and all video signals are inhibited.

The multivibrators 216 and 206 are designed to have definite output pulse durations as the trailing edges of these output pulses define the read interval or passing zones. The time duration of the two scans is slightly less than a scan cycle, the difference being the time allotted to the hunt period. Actually, the multivibrator 211 is on for a period that is longer than the hunt period and, for reliability, has a duration slightly longer than a scan cycle. Since the multivibrator 211 is cut off by the synch pulse signal, it will normally be on much less than a cycle.

The multivibrator 211 prevents the passage of video signals through gate 214 during the transition from the no pass to the passing zone when the other multivibrators switch states. Erratic operation would result if video signals were allowed to pass at this time. Actually, in operation the change of the video signal that occurs at this time is slight, therefore, the multivibrator is not necessary. In this situation gate 204, differentiator network 209, and multivibrator 211 of Fig. 7 can be eliminated and the output terminal 210 of the multivibrator 206 can be connected directly to the input terminal 212 of gate 214 to keep gate 214 closed at all times except during the hunt period. Thus, in this modification, the border signal itself is used to start and stop the system, however, a start-stop pulse signal can be introduced easily if it is desired.

Obviously many modifications and variations of the present invention are possible in the light of the above teachings. It is therefore to be understood that within the scope of the appended claims the invention may be practiced otherwise than as specifically described.

What is claimed is:

1. A border follower comprising a scanning means positioned to scan a document that contains a contrasting border and a printed character, a first means coupled to said scanning means to pass a signal that represents the scanning of the contrasting border, second means coupled to said scanning means and to said first means to generate a potential proportional to the position of the border, third means coupled to said scanning means to pass a signal that represents the character scanned, and fourth means driven by said second means and coupled to said first, and third means to inhibit the passage of signals through said first means and to condition said third means to pass a signal.

2. A border follower comprising a scanning means positioned to scan a document that contains a contrasting border and a printed character, a first And gate coupled to said scanning means to pass a signal that represents the scanning of the contrasting border, first means coupled to said scanning means and to said first gate to generate a potential proportional to the position of the border, a second And gate coupled to said scanning means to pass a signal that represents the scanning of the printed character, and second means driven by said first means and coupled to said first and second And gates to inhibit the passage of signals through said first And gate and to condition said second And gate to pass a signal.

3. A border follower comprising a scanning means positioned to scan a document that contains a contrasting border and a printed character, a first gate coupled to said scanning means to pass a signal that represents the scanning of the contrasting border, first means coupled to said scanning means and to said first gate to generate a potential proportional to the position of the border, comparison means fed by said scanning means and said first means to generate a differential signal, a second gate coupled to said scanning means to pass a signal that represents the character scanned, and second means driven by said comparison means and coupled to said first and second gates to close said first gate and to open said second gate to pass a signal.

4. A border follower comprising a scanning means positioned to scan a document that contains a contrasting border and a printed character, a first gate coupled to said scanning means to pass a signal that represents the scanning of the contrasting border, first means coupled to said scanning means and to said first gate to generate a potential proportional to the position of the border, a storage means fed by said first means to retain the generated potential, comparison means fed by said scanning means and said first means to generate a differential signal, a second gate coupled to said scanning means to pass a signal that represents the character scanned, and second means driven by said comparison means and coupled to said first and second gates to close said first gate and to open said second gate to pass a signal.

5. A border follower comprising a scanning means positioned to scan a document that contains a contrasting border and a printed character, a first gate coupled to said scanning means to pass a signal that represents the scanning of the contrasting border, first means coupled to said scanning means and to said first gate to generate a potential proportional to the position of the border, a capacitor fed by said first means to store the generated potential, comparison means fed by said scanning means and said first means to generate a differential signal, a second gate coupled to said scanning means to pass a signal that represents the character scanned, and second means driven by said comparison means and coupled to said first and second gates to close said first gate and to open said second gate to pass a signal.

6. A border follower comprising a scanning means positioned to scan a document that contains a contrasting border and a printed character, a first gate coupled to said scanning means to pass a signal that represents the scanning of the contrasting border, first means coupled to said scanning means and to said first gate to pass a potential proportional to the position of the border, a capacitor fed by said first means to store the generated potential, comparison means fed by said scanning means and said first means to generate a differential signal, a second gate coupled to said scanning means to pass a signal that represents the character scanned, second means driven by said comparison means and coupled to said first and second gates to condition said first gate to inhibit the passage of signals and said second gate to pass signals, and discharge means coupled to discharge said capacitor prior to the next appearing signal from said first gate.

7. A border follower comprising a scanning means positioned to scan a document that contains a contrasting border and a printed character, a first gate coupled to said scanning means to pass a signal that represents the scanning of the contrasting border, first means coupled to said scanning means and to said first gate to pass a potential proportional to the position of the border, a capacitor fed by said first means to store the generated potential, comparison means fed by said scanning means and said first means to generate a differential signal, a second gate coupled to said scanning means to pass a signal that represents the character scanned, and voltage amplitude sensitive means fed by said comparison means and coupled to said first and second gates to condition said first gate to inhibit the passage of signals and said second gate to allow the passage of signals.

8. A border follower comprising a scanning means positioned to scan a document that contains a contrasting border and a printed character, a first gate coupled to said scanning means to pass a signal that represents the scanning of the contrasting border, first means coupled to said scanning means and to said first gate to pass a potential proportional to the position of the border, a capacitor fed by said first means to store the generated potential, comparison means fed by said scanning means and said first means to generate a differential signal, a second gate coupled to said scanning means to pass a signal that represents the character scanned, voltage amplitude sensitive means fed by said comparison means, and bistable means driven by said voltage amplitude sensitive means and coupled to said first and second gates to condition said first gate to inhibit the passage of signals and said second gate to allow the passage of signals.

9. A border follower comprising a scanning means positioned to scan a document that contains a contrasting border and a printed character, a first gate coupled to said scanning means to pass a signal that represents the scanning of the contrasting border, first means coupled to said scanning means and to said first gate a potential proportional to the position of the border, a capacitor fed by said first means to store the generated potential, comparison means fed by said scanning means and said first means to generate a differential signal, a second gate coupled to said scanning means to pass a signal that represents the character scanned, voltage amplitude sensitive means fed by said comparison means, and a flip-flop driven by said voltage amplitude sensitive means and coupled to said first and second gates to condition said first gate to inhibit the passage of signals and said second gate to allow the passage of signals.

10. A border follower comprising a scanning means positioned to scan a document that contains a contrasting border and a printed character, a first gate coupled to said scanning means to pass a signal that represents the scanning of the contrasting border, first means coupled to said scanning means and to said first gate to pass a potential proportional to the position of the border, a capacitor fed by said first means to store the generated potential, comparison means fed by said scanning means and said first means to generate a differential signal, a second gate coupled to said scanning means to pass a signal that represents the character scanned, high voltage sensitive means fed by said comparison means, low voltage sensitive means fed by said comparison means, first bistable means driven by said low voltage sensitive means and coupled to said first gate, second bistable means driven by said high and low voltage sensitive means and coupled to said first and second gates said first and second bistable means conditioning said gates to pass appropriate signals.

11. A border follower comprising a scanning means positioned to scan a document that contains a contrasting border and a printed character, a first gate coupled to said scanning means to pass a signal that represents the scanning of the contrasting border, first means coupled to said scanning means and to said first gate to pass a potential proportional to the position of the border, a capacitor fed by said first means to store the generated potential, comparison means fed by said scanning means and said first means to generate a differential signal, a second gate coupled to said scanning means to pass a signal that represents the character scanned, a first voltage sensitive means conditioned to conduct at a predetermined potential fed by said comparison means, a second voltage sensitive means conditioned to conduct at a lower predetermined potential fed by said comparison means, first flip-flop driven by said second voltage sensitive means and coupled to condition said first gate, second flip-flop driven by said first and second voltage sensitive means and coupled to condition said first and second gates to pass appropriate signals, and discharge means activated by said second flip-flop and coupled to discharge said capacitor prior to indicating electrically the position of the border next scanned.

12. A border follower comprising a scanning means positioned to scan a document that contains a contrasting border and a printed character, a first And gate coupled to said scanning means to pass a signal that represents the scanning of the contrasting border, first means coupled to said scanning means and to said first And gate to pass a potential proportional to the position of the border, a capacitor fed by said first means to store the generated potential, comparison means fed by said scanning means and said first means to generate a differential signal, a second And gate coupled to said scanning means to pass a signal that represents the character scanned, a first Schmitt trigger fed by said comparison means, a first source of reference potential coupled to preset said first Schmitt trigger to conduct at a predetermined potential, a second Schmitt trigger fed by said comparison means, a second source of reference potential coupled to preset said second Schmitt trigger to conduct at a lower predetermined potential, a first flip-flop driven by said second Schmitt trigger and coupled to condition said first And gate, a second flip-flop driven by said first and second Schmitt triggers and coupled to condition said first and second gates to pass appropriate signals, and discharge means activated by said second Schmitt trigger and coupled to discharge said capacitor prior to the next appearing signal from said first And gate.

13. A border follower comprising a scanning means positioned to scan a document that contains a contrasting border and a printed character, a first gate coupled to said scanning means to pass a signal that represents the scanning of the contrasting border, a second gate coupled to said scanning means to pass a signal that represents the character scanned, first multivibrator coupled to said first gate to inhibit the passage of all signals immediately after the appearance of a signal that represents the border, and a second multivibrator fed by said first multivibrator and coupled to feed said first and second gates to condition said second gate to pass signals that represent the character scanned and said first gate to pass a next appearing signal that represents the border.

14. A border follower comprising a scanning means positioned to scan a document that contains a contrasting border and a printed character, a first gate coupled to said scanning means to pass a signal that represents the scanning of the contrasting border, a second gate coupled to said scanning means to pass a signal that represents the character scanned, a first multivibrator coupled to condition said first gate to inhibit the passage of all signals immediately after the appearance of a border representing signal, and second multivibrator fed by said first multivibrator and coupled to feed said first and second gates to condition said second gate to pass signals that represent the character scanned and said first gate to pass a next appearing signal that represents the border, a third multivibrator interposed between said first gate and said second multivibrator, and a source of synchronizing pulse signals coupled to said third multivibrator to open said first gate to pass signals.

15. A border follower comprising a sensing means to scan an area of a document that contains a contrasting border and a printed character, a first gate fed by said sensing means to pass a border signal, a first multivibrator coupled to close said first gate immediately after said border signal is passed, a second gate coupled to said sensing means, a second multivibrator fed by said first multivibrator and coupled to open said second gate to pass signals from said sensing means, a third gate coupled to said second multivibrator, a third multivibrator interposed between said third gate and said first gate, a source of start-stop pulse signals coupled to said third gate to control operation, and a source of synchronizing pulse signals coupled to said third multivibrator to close said first gate.

16. A border follower comprising a sensing means to scan an area of a document that contains a contrasting border and a printed character, a first And gate fed by said sensing means to pass a border signal, a first multivibrator coupled to close said first gate immediately after said border signal is passed, a second And gate coupled to said sensing means, a second multivibrator fed by said first multivibrator and coupled to open said second gate for a specific interval of time to pass signals from said sensing means, a third And gate fed by said second multivibrator, a third multivibrator interposed between said third And gate and said first And gate, a source of start-stop pulse signals coupled to said third gate to control operation, and a source of synchronizing pulse signals coupled to said third multivibrator to close said first And gate.

References Cited in the file of this patent

UNITED STATES PATENTS

| | | |
|---|---|---|
| 2,596,741 | Tyler | May 13, 1952 |
| 2,706,215 | Van Duuren | Apr. 12, 1955 |

UNITED STATES PATENT OFFICE
CERTIFICATE OF CORRECTION

Patent No. 2,894,248 July 7, 1959

Matthew J. Relis et al.

It is hereby certified that error appears in the printed specification of the above numbered patent requiring correction and that the said Letters Patent should read as corrected below.

Column 1, line 40, for "retarding" read -- retarded --; line 61, for "of" read -- on --; column 7, line 34, after "209" insert -- to --; line 36, before "a" strike out "to"; column 10, line 55, after "gate" insert -- to pass --.

Signed and sealed this 16th day of February 1960.

(SEAL)
Attest:

KARL H. AXLINE
Attesting Officer

ROBERT C. WATSON
Commissioner of Patents